United States Patent Office 2,901,083
Patented Aug. 25, 1959

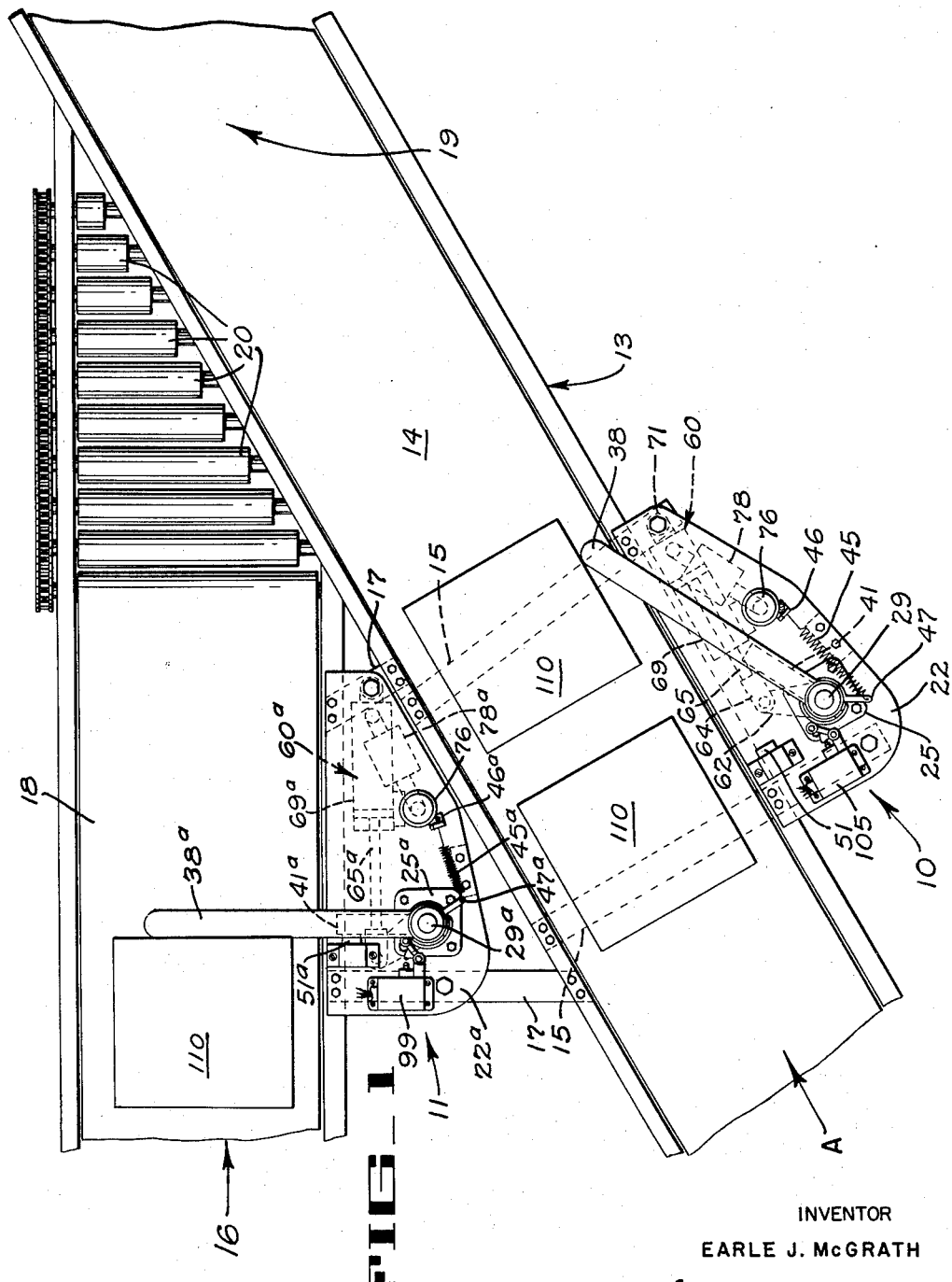

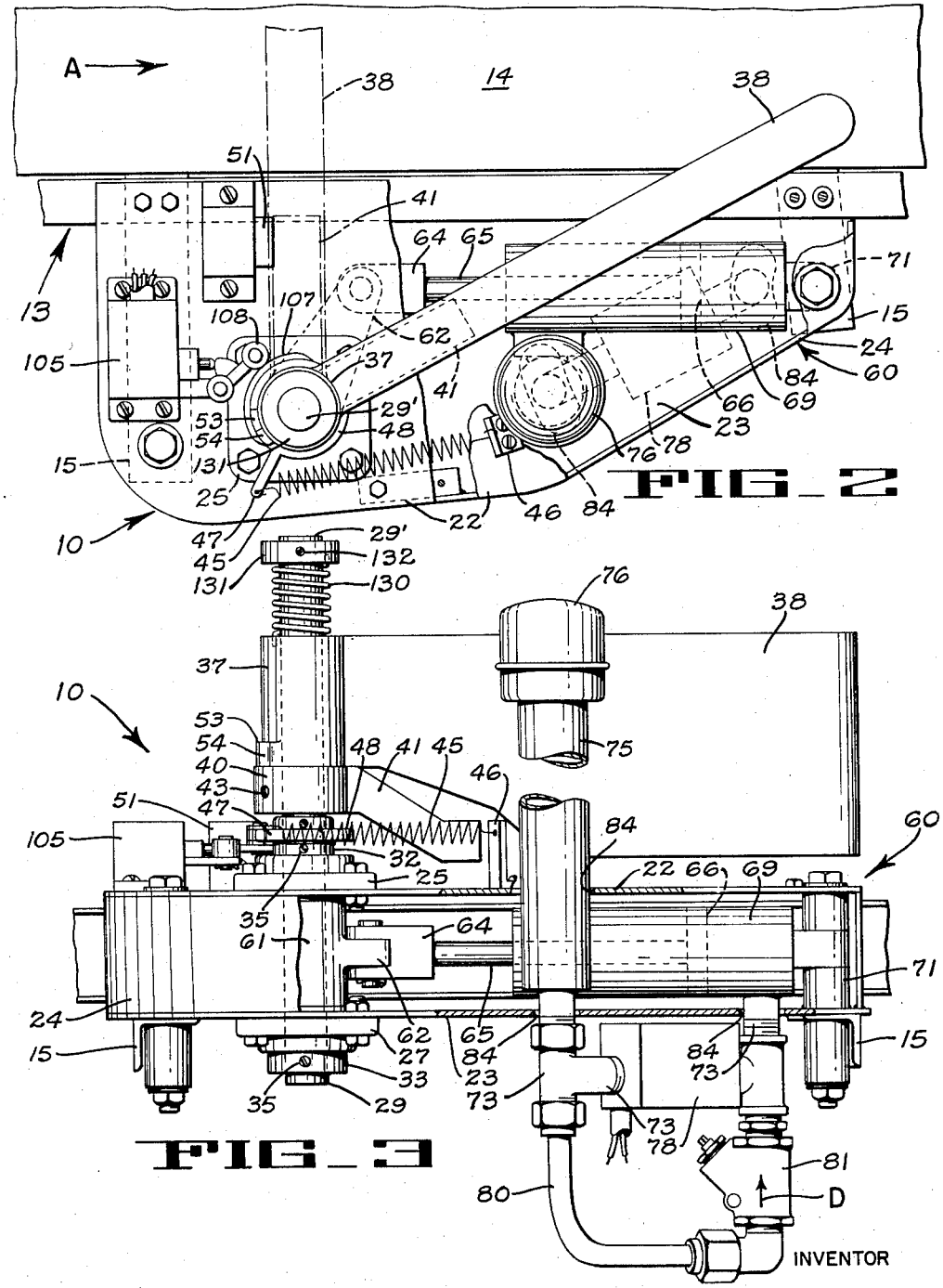

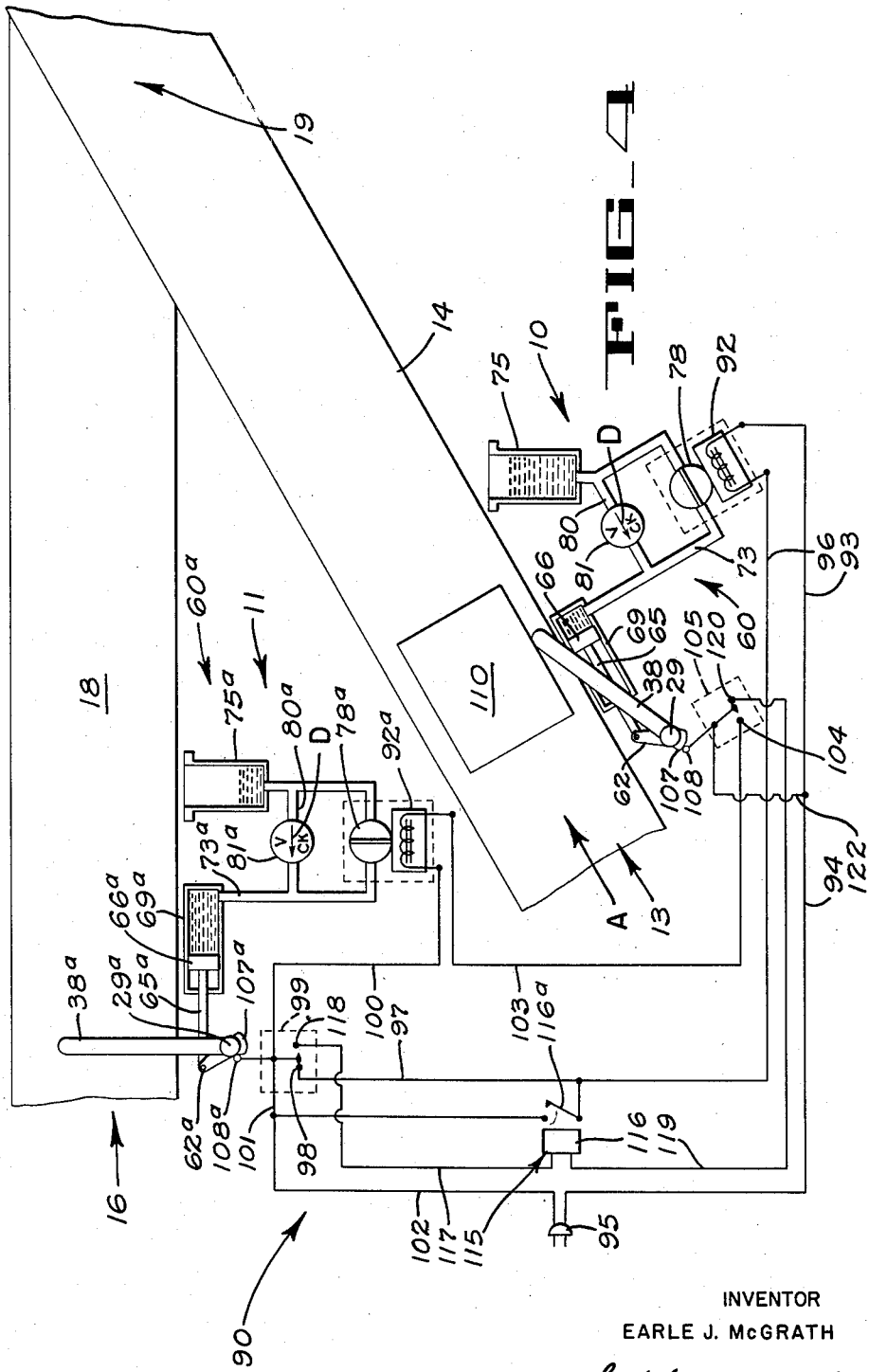

2,901,083

ARTICLE CONTROL MECHANISM FOR CONVEYORS

Earle J. McGrath, San Bernardino, Calif., assignor to Food Machinery and Chemical Corporation, San Jose, Calif., a corporation of Delaware Application March 25, 1955, Serial No. 496,659

9 Claims. (Cl. 198—21)

This invention relates to an article conveying system and more particularly pertains to an improved mechanism for controlling the movement of articles on interconnected conveying surfaces.

In an article conveying system where one or more branches feed into a main conveyor, or where two conveyors converge, it often happens that an article from one conveyor will arrive at the junction of the two conveyors at the same time that one or more articles on the other conveyor are passing this junction. Under such conditions, it is evident that a collision of articles will occur resulting in damage to the articles and jamming of the entire conveyor system.

An object of the present invention is to provide an improved article delivery control mechanism for controlling the movement of articles through the junction of two interconnected conveyors.

Another object is to provide an article delivery control mechanism of the above-mentioned type which will not jam when articles being advanced on two interconnected conveyors arrive simultaneously at control stations which are designed to normally give precedence to the article that arrives first at either one of the control stations.

Another object is to provide an article control device capable of regulating the time at which articles, released by the device, arrive at the junction of the interconnecting conveyors.

These and other objects and advantages of the present invention will become apparent from the following description and accompanying drawings in which:

Fig. 1 is a fragmentary plan view of two interconnecting conveyors having the present article control mechanism associated therewith.

Fig. 2 is an enlarged fragmentary plan view of the structure shown in Fig. 1.

Fig. 3 is an elevation of the structure shown in Fig. 2, certain parts being broken away.

Fig. 4 is a diagrammatic illustration of the present article control mechanism including the electrical system thereof.

The article control mechanism of the present invention comprises two substantially identical control units 10 and 11 (Fig. 1). The unit 10 is mounted alongside a main conveyor 13 and is arranged to control the flow of articles on the endless conveying belt 14 of the conveyor. The unit 10 may be conveniently supported by being secured to the frame of the conveyor by bars 15. The unit 11 is mounted between the main conveyor 13 and an auxiliary conveyor 16 on straps 17. This auxiliary conveyor is disposed at an acute angle to the main conveyor and is adapted to deliver articles onto the main conveyor at a junction 19. The auxiliary conveyor 16 comprises a power driven endless belt 18 and a plurality of driven rollers 20 which form a V-shaped conveying section immediately adjacent the junction 19.

Since the control units 10 and 11 are substantially identical, a description of one will be sufficient to disclose the structure of both. Accordingly, the unit 10 will be specifically described and the parts of the unit 11, which correspond to parts of the unit 10, will be given identical reference numerals followed by a suffix "a."

The article control unit 10 (Fig. 3) comprises two support plates 22 and 23 held in vertically spaced, parallel relation by a vertical marginal wall 24. Bearing assemblies 25 and 27 are secured on the plates 22 and 23, respectively, around aligned apertures (not shown) in the plates. A shaft 29 extends through the aligned apertures and is rotatably journalled in the bearing assemblies. The shaft is supported by collars 32 and 33 which are secured by set screws 35 to the shaft 29 above and below the bearing assemblies. The upper portion 29' of the shaft 29 projects above the upper bearing 25 to rotatably journal a sleeve 37 of a gate 38. The sleeve 37 rests on a mounting collar 40 of a stop arm 41 which is adjustably secured to the shaft 29 by a set screw 43.

The shaft 29 is urged in a counterclockwise direction (Fig. 2) by means of a tension spring 45 which is anchored at one end to an L-shaped bracket 46 and, at the other end, to an arm 47 that extends radially outwardly from a collar 48 secured to the shaft 29. The counterclockwise rotation of the shaft 29 is limited by the abutment of the stop arm 41 with a fixed stop member 51 (Fig. 2) which is secured to the plate 22. As the stop arm 41 is swung in a counterclockwise direction toward the stop member 51, it swings the gate 38 in a counterclockwise direction through the engagement of a pin 53, that projects upwardly from the collar 40 of the stop arm 41, with an ear 54 that projects radially from the sleeve 37 of the gate 38. With this arrangement, the tension spring 45 normally holds the stop arm 41 and the gate 38 in the phantom line position of Fig. 2, extending transversely of the path of movement of articles on the conveyor. When an article moving in the direction of arrow A contacts the gate 38, it swings the gate 38 and the stop arm 41 in a clockwise direction against the force of the spring 45 to an open position out of the path of the article.

To prevent the movement of articles past the gates 38 and 38a (Fig. 1) and into the junction 19 at times when they might collide, the shafts 29 and 29a are connected by suitable linkages with hydraulic lock mechanisms 60 and 60a (Fig. 4), respectively. The linkage for the hydraulic lock mechanism 60 (Fig. 3) comprises a collar 61 secured to the shaft 29 between the plates 22 and 23. The collar 61 has a radially extending arm 62 integral therewith, said arm being pivotally connected to the outer end 64 of the piston rod 65 of a piston 66 (Fig. 2). The piston 66 is enclosed in a hydraulic cylinder 69, the rear end of which is pivotally mounted between the plates 22 and 24 (Fig. 3) on a vertically extending shaft 71 secured to said plates 22 and 23. The right end of the cylinder 69 is adapted to contain liquid and it communicates through a pipe line 73 with a cylindrical, vertically disposed liquid reservoir 75 that extends far enough above the cylinder 69 to provide a head of liquid for the cylinder. The upper end of the reservoir opens to the atmosphere through a breather cap 76. The flow of liquid in the line 73 is controlled by a normally open valve 78 that is connected in parallel with a hydraulic line 80 which includes a check valve 81. Said check valve 81 will only permit liquid to flow therethrough in the direction of the arrow D (Fig. 3) and the sole purpose of the line 80 is to speed the return of liquid to the cylinder 69 after it has been forced into the reservoir 75 by the piston 66. The reservoir 75 is rigidly secured to the side of the cylinder 69, and, in order to permit the cylinder to swing about the shaft 71 and thus remain aligned with the piston 66 upon movement of the same within the cylinder, the plates 22 and 23 are provided with arcuate slots 84 (Fig. 2) where the reservoir 75 and the line 73 pass therethrough.

From the above it will be apparent that when articles moving on the conveyor 13 in the direction of the arrow A (Fig. 1) swing the gate 38 out of their path, the lever 62 will be swung clockwise to the position shown in Fig. 2, thus moving the piston 66 to the right and forcing liquid out of the cylinder 69 through the normally open valve 78 and into the reservoir 75. When the articles moving on the conveyor 13 have passed the gate 38, the spring 45 will return the gate 38 and the stop bar 41 to closed, article intercepting position across the conveyor 13 and the piston 66 will be moved to the left (Fig. 2), whereupon liquid will flow from the reservoir 75 through the open valve 78 and into the cylinder 69. The return of liquid to the cylinder is materially hastened by the hydraulic line 80 which also carries liquid from the reservoir 75 to the cylinder 69 through the check valve 81. It will be noted, however, that if the valve 78 is closed, articles moving in the direction of the arrow A will be unable to swing the gate 38 out of their way since the piston 66 will not be able to force the liquid out of the cylinder 69 and into the reservoir 75. Thus, closing the valve 78 locks the gate 38 in closed position, and prevents articles on the conveyor 13 from moving into the junction 19.

The article control units 10 and 11 are interconnected by an electrical control apparatus 90 (Fig. 4), in such a way that, when one of the gates 38 or 38a is swung out of the way by an article moving toward the junction 19, the valve 78 or 78a associated with the other gate will be closed, thus preventing said other gate from moving out of the path of articles contacting the same. Said apparatus 90 includes a solenoid 92 which, together with the valve 78, makes up an electrically operated valve assembly. A second solenoid 92a is part of an electrically operated valve assembly that includes the valve 78a. The solenoid 92 is connected through conductors 93 and 94 to a source of power 95 and through conductors 96 and 97 to one pole 98 of a switch 99. The solenoid 92a is connected through conductors 100, 101 and 102 to the power source 95 and through conductor 103 to one pole 104 of a switch 105. When the gate 38a is in the spring-urged article-arresting position shown in Fig. 4, a cam 107a on shaft 29a pivots a follower lever 108a and closes the switch 99 through contact 98 thereby energizing the solenoid 92 from the power source 95, through conductors 102, 101, switch 99, conductors 97 and 96, coil 92 and conductors 93 and 94. The energized solenoid 92 holds the valve 78 open, permitting flow of fluid in either direction in the hydraulic circuit of valve 78. Similarly, when the gate 38 is in its normal article-arresting position, switch 105 is closed through contact 104 and the solenoid 92a is energized to hold the valve 78a open, permitting flow of fluid in either direction in the hydraulic circuit of valve 78a. However, when the gate 38a is swung slightly toward an open position by an article on the conveyor 16, the switch 99 is actuated to open the circuit of the solenoid 92 to deenergize the same, permitting valve 78 to close and lock the gate 38 in closed, article-arresting position. Similarly, when an article on conveyor 13 swings the gate 38 toward open position, solenoid 92a is de-energized, valve 78a is closed, and gate 38a is locked in article-arresting position. Thus, the gates 38 and 38a are normally swung to article-arresting position across their associated conveyors, the solenoids 92 and 92a are normally energized, and the valves 78 and 78a are normally held in open position permitting flow of fluid in either direction through the valves. However, the first gate to be contacted by an article and swung toward open position will de-energize a solenoid and cause the closing of the valve that will lock the other gate in fixed, article-arresting position.

For example, as shown in Fig. 4, when an article 110 traveling in the direction of the arrow A on the conveyor 13 swings the gate 38 toward open position, the switch 105 is actuated by the cam 107 to open the circuit to the solenoid 92a thereby de-energizing the same and causing the valve 78a to close. With the valve 78a closed, the piston 66a cannot force liquid out of the cylinder 69a and into the reservoir 75a. Hence, the gate 38a is locked in closed position and articles contacting said gate will be prevented from entering the junction 19 until the article 110 and any closely spaced, immediately succeeding articles have cleared the gate 38 so that it can be returned to article-arresting position. Upon return of the gate 38 to its closed position, the cam 107 allows the switch 105 to close the circuit to the solenoid 92a, whereupon said solenoid is again energized, the valve 78a is opened, and the control apparatus 90 readied to arrest articles on either one of the conveyors 13 or 16 upon actuation of the gate of the other conveyor by articles moving toward the junction 19.

Occasionally, articles moving toward the junction 19 on the conveyors 13 and 16 contact the gates 38 and 38a at substantially the same time thereby opening both circuits 97—96 and 103 and de-energizing the solenoids 92 and 92a. If some provision is not made for maintaining one of the solenoids 92 or 92a energized under these circumstances, both of the gates 38 and 38a will be locked in closed position and the control mechanism will be jammed, i.e. unable to supply articles to the junction 19 from either conveyor 13 or 16. In order to prevent such a jamming of the control mechanism, a secondary electrical control apparatus 115 (Fig. 4) is arranged with the control apparatus 90. Said secondary control apparatus 115 comprises a relay 116 which is electrically connected through a conductor 117 to a pole 118 of the switch 99 and through a conductor 119 to a pole 120 of the switch 105. If both gates 38 and 38a are swung toward open position simultaneously, the relay 116 is energized from the power source 95, through conductors 94 and 122, switch 105, conductors 119 and 117, switch 99, and conductors 101 and 102. Energization of relay 116 closes contact 116a and energizes a circuit containing solenoid 92. With this arrangement, the solenoids 92 and 92a are first de-energized by the initial swinging movement of the two gates and accordingly both valves 78 and 78a are closed and both of the gates are locked before any articles pass through. However, the solenoid 92 is immediately re-energized to open the valve 78 and permit passage of articles on conveyor 13. Thus, conveyor 13 will be given priority when articles arrive simultaneously at the two gates 38 and 38a.

In the event that it is desired to operate the conveyor 13 in a reversed direction, so that articles thereon will travel in a direction opposite to that indicated by the arrow A, no adjustment of the article control unit 10 need be made. Articles approaching the closed gate 38 will swing the gate counterclockwise independently of the shaft 29 and independently of the stop arm 41. After the articles have passed the gate 38, the gate will be returned to its closed position over the conveyor by a torsion spring 130 (Fig. 3) which is disposed around the shaft 29 and anchored at its lower end in the collar 37 and its upper end in a collar 131 which is secured to the shaft 29 by a set screw 132. It will be evident that, if provision for two-way travel on the conveyor is not desired, the stop arm 41 may be eliminated and the gate may be keyed directly to the shaft 29, relying upon the piston 66 to locate the gate 38 over the conveyor.

It is to be noted that since there is no mechanical connection between the control units 10 and 11 either unit may be shifted to any desired position on its associated conveyor independently of the position of the other unit. With such a flexible arrangement, the units 10 and 11 can be so positioned that the last article released by one of the units has adequate time to pass through the junction 19 before articles released by the other unit reach the junction.

From the foregoing description, it will be seen that this invention provides a simple, efficient mechanism for controlling the flow of articles through the junction of two converging conveyors. The use of a hydraulic lock mechanism provides a particularly quick acting positive means for holding one of the control gates in position against the urging of articles being advanced on the associated conveyor. Also, the arrangement whereby the units are not connected mechanically but only electrically provides a particularly flexible control arrangement.

Having thus described my invention what I claim as new and desire to protect by Letters Patent is:

1. An article control mechanism for two converging conveyors comprising a stop member mounted adjacent one of said conveyors for movement between an article-arresting position over the conveyor to a position removed from the path of movement of articles on the conveyor, a hydraulic cylinder having a piston connected to said stop member, a fluid supply line for said cylinder, an electrically operated valve in said fluid line arranged to be moved to a closed position stopping the flow of fluid in said line to lock said stop member in a fixed position, an electric circuit for said valve, a switch in said circuit arranged upon actuation to control said circuit to effect movement of said valve to closed position, and a movable actuating member mounted on the other conveyor in the path of movement of articles thereon and operatively connected to said switch to actuate said switch upon a predetermined movement of said actuating member.

2. An article control mechanism for two converging conveyors comprising an article stop member associated with each conveyor and mounted adjacent the conveyor for movement between an article-arresting position in the path of articles being advanced thereon and a position removed from said path, means biasing each stop member to article-arresting position, a hydraulic system for said stop members, an electrically actuated member operatively connected in said hydraulic system for each of said stop members and arranged upon actuation to effect locking the respective stop member in article-arresting position, a control circuit for each of said electrically actuated members, and a switch in each circuit arranged upon movement to a predetermined position to control the circuit to effect actuation of the electrically actuated member thereof into stop member-locking position, the switch in the circuit associated with one stop member being mounted in the path of movement of the other stop member to be moved to said predetermined position as said other stop member moves out of the path of articles on its associated conveyor.

3. An article control mechanism for two converging conveyors comprising an article stop member associated with each conveyor and mounted adjacent the conveyor for movement between an article-arresting position over the conveyor and a position removed from said path, means biasing each stop member to article-arresting position, a linkage connected to each stop member, a hydraulic control system operatively connected to each linkage, electrically actuated means in each hydraulic system arranged upon actuation to block the flow of fluid in each control system to lock the associated linkage and stop member in said article-arresting position, an electric circuit for each electrically actuated means, and a switch in each circuit arranged upon being moved to a predetermined position to control the circuit to effect the actuation of said electrically actuated blocking means, the switch in the circuit associated with one stop member being mounted in the path of movement of the other stop member to be moved to said predetermined position thereby as said other stop member moves out of the path of articles on the associated conveyor.

4. An article control mechanism for two converging conveyors comprising an article stop member associated with each conveyor and mounted adjacent the conveyor for movement between an article-arresting position over the conveyor and a position removed from said path, means biasing each stop member to article-arresting position, a linkage connected to each stop member, a fluid pressure cylinder disposed adjacent each linkage, a piston in each cylinder connected to one of said linkages, a hydraulic circuit for each cylinder, an electrically actuated valve in each hydraulic circuit arranged upon being de-energized to stop flow of fluid in said circuit to lock the piston in a position corresponding to the article-arresting position of the associated stop member, an electric circuit for each electrically actuated valve, and a switch in each electric circuit arranged to de-energize the circuit upon being moved to open position, the switch in the circuit associated with one stop member being mounted in the path of movement of the other stop member to be opened thereby as said other stop member moves out of the path of articles on the associated conveyor.

5. An article control mechanism for two converging conveyors comprising a pair of stop arms, one of said arms being adapted to normally project over one conveyor and the other arm over the other conveyor in the paths of articles traveling along said conveyors, means mounting each arm for swinging movement from closed article-arresting position over the associated conveyor to an open position permitting articles to pass and for adjusting movement relative to the point of convergence of the two conveyors, a hydraulic system connected with said stop arms, an electrically actuated control member for each stop arm operatively connected in the hydraulic system and arranged upon actuation to effect locking of the associated stop arm in closed position, an electric control circuit for said electrically actuated members, and switch means in said circuit disposed in the paths of movement of said stop arms to be actuated thereby and arranged when actuated simultaneously by both of said stop arms to condition the electric control circuit to actuate one of said control members to lock one of said stop arms in closed position.

6. An article control mechanism for a conveyor adapted to carry articles in opposite directions comprising a shaft rotatably mounted on the conveyor, a gate swingably mounted on said shaft for positioning in the path of articles traveling on the conveyor, first abutment members on the gate and on the shaft to limit swinging movement of the gate on the shaft in one direction, means yieldably urging the gate in said one direction to bring said first abutment members into contact, second abutment members on the shaft and on the conveyor to limit rotation of said shaft in a direction opposite to said one direction, means yieldably urging the shaft in said opposite direction to bring said second abutment members into contact, said first and second abutment members being so arranged as to normally hold the gate in the path of articles traveling on the conveyor, and locking means operatively connected to said shaft and arranged upon actuation to prevent rotation of the shaft and the gate in said one direction by articles traveling on the conveyor.

7. An article control mechanism for a conveyor comprising a gate mounted in the path of articles on the conveyor for movement between opened and closed positions, a hydraulic cylinder and piston arrangement operatively connected to the gate so that movement of the gate will move the piston relative to the cylinder, a source of liquid under pressure, a first conduit establishing communication between said source and said cylinder and including a normally open liquid control valve, a second conduit connected in parallel with said first conduit and cooperating therewith to define parallel flow passages between said cylinder and said source, and a check valve in said second conduit arranged to permit passage of fluid in said second conduit in a direction toward said cylinder when said liquid control valve is either closed or open, said check valve being arranged to prevent opening of said gate when said liquid control valve is closed and arranged to permit closing of said gate when the valve is either closed or open.

8. An article control mechanism for two converging conveyors comprising an article stop member associated with each conveyor and mounted adjacent the conveyor for movement between an article-arresting position in the path of articles being advanced thereon and a position removed from said path, means biasing each stop member to article-arresting position, a hydraulic cylinder operatively connected to each stop member, an electrically operated valve for each cylinder, each valve being arranged to be independently moved to a closed position for stopping fluid from flowing out of its associated cylinder whereby to lock the associated stop member in article-arresting position, a control circuit for each of said electrically operated valves, and a switch in each circuit arranged upon movement to a predetermined position to control the circuit to effect movement of the electrically operated valve in that circuit to closed position, the switch in the circuit associated with one stop member being mounted in the path of movement of the other stop member and arranged to be moved to said predetermined position as said other stop member moves out of the path of articles on its associated conveyor.

9. In a control mechanism for articles moving in either of two opposite directions along a path of travel, a control gate mounted for movement into and out of an initial position to be engaged by articles traveling in either direction to move the gate out of the path of the articles, separate spring means connected to said gate respectively for returning the gate to said initial position after its removal by a said article from the path of the articles moving in either of said opposite directions, a hydraulic cylinder operatively connected to said gate, a valve connected to said cylinder and movable to closed position to stop fluid flow from the cylinder and thereby block movement of the gate by an article moving in one direction along said path, and remote control means associated with said valve for moving the valve to closed position.

References Cited in the file of this patent
UNITED STATES PATENTS

| | | |
|---|---|---|
| 1,579,545 | Langsdorf | Apr. 6, 1926 |
| 2,130,330 | Sibley | Sept. 13, 1938 |
| 2,499,889 | Teichmann | Mar. 7, 1950 |
| 2,617,516 | Sullivan | Nov. 11, 1952 |
| 2,624,440 | Hornberger | Jan. 6, 1953 |
| 2,690,250 | Coleman | Sept. 28, 1954 |
| 2,801,725 | Sindzinski et al. | Aug. 6, 1957 |